(12) United States Patent
Chen et al.

(10) Patent No.: US 8,510,978 B2
(45) Date of Patent: Aug. 20, 2013

(54) RFID TAG HOLDER

(75) Inventors: Sung-Lin Chen, Kaohsiung (TW);
Chang-Tsun Lin, Kaohsiung (TW);
Lien-Kuei Chiang, Kaohsiung (TW)

(73) Assignee: China Steel Corporation, Kaohsiung (TW)

( * ) Notice: Subject to any disclaimer, the term of this patent is extended or adjusted under 35 U.S.C. 154(b) by 169 days.

(21) Appl. No.: 13/287,363

(22) Filed: Nov. 2, 2011

(65) Prior Publication Data

US 2012/0175491 A1    Jul. 12, 2012

(30) Foreign Application Priority Data

Jan. 11, 2011    (TW) .............................. 100100886 A

(51) Int. Cl.
*G09F 3/18*    (2006.01)
(52) U.S. Cl.
USPC .......... 40/642.02; 24/662; 24/104; 248/206.5
(58) Field of Classification Search
USPC ................. 40/642.02, 658, 661.01; 248/683, 248/309.4, 206.5; 24/104, 114.4, 114.05
See application file for complete search history.

(56) References Cited

U.S. PATENT DOCUMENTS

| | | | | |
|---|---|---|---|---|
| 6,477,799 | B1 * | 11/2002 | Erickson et al. ............... | 40/406 |
| 6,598,752 | B1 * | 7/2003 | Davidov ......................... | 211/40 |
| 6,671,986 | B2 * | 1/2004 | Reeves ............................ | 40/1.6 |
| 2010/0088937 | A1 * | 4/2010 | Lee et al. ................... | 40/642.02 |
| 2011/0278407 | A1 * | 11/2011 | Osiecki et al. ............. | 248/206.5 |

* cited by examiner

*Primary Examiner* — Joanne Silbermann
*Assistant Examiner* — Shin Kim
(74) *Attorney, Agent, or Firm* — WPAT, P.C.; Anthony King

(57) ABSTRACT

The present invention relates to an RFID tag holder, which comprises an RFID tag carrier used to carry an RFID tag, and a base having a circular surface, a holding portion and at least one magnetic component disposed therein. The shape of the circular surface matches that of the disposing hole, the magnetic component is used to make the disposing hole magnetically attachable to combine the base with the disposing hole, and two clip arms of a holding unit grip the holding portion and hold the RFID tag carrier after passing through two through holes of a metal substrate. The RFID tag holder has the following advantages: fast installation, low cost and reusability; is suitable for disposing holes with any depth and size; reduced interference and improved reading effect; no extra processing cost; dust-proof, water-proof and oil-resistant; and better composability, extensibility and flexibility.

10 Claims, 7 Drawing Sheets

RFID TAG HOLDER

BACKGROUND OF THE INVENTION

1. Field of the Invention

The present invention relates to an RFID tag holder, and more particularly to a magnetically attached RFID tag holder.

2. Description of the Related Art

The application of RFID (Radio Frequency Identification) tags is universal, and has obvious effect especially on the logistics management of commodity supply chain. RFID tags are mostly directly attached to packing cases or cartons, in which case tag attaching is not a big problem. In the case of huge objects or apparatuses, though, RFID tags cannot be firmly attached, and therefore are mostly installed by screws.

However, most apparatuses are made of metal, and the drilling and tapping processing cause an extremely high cost, and the structure and characteristic of the original apparatuses cannot be maintained and guaranteed after drilling. Therefore, how to overcome problems in RFID technique for industry application and how to install the designed RFID tag on the apparatuses efficiently and easily are very important technical objectives.

Take steel production line for example, a roller is a necessary and consuming apparatus; each roller has its own identification code, which is mostly carved on the side surface of the roller before delivery for efficient identification in use. However, after the roller is used, the code often becomes unintelligible because it may be covered by grease, dirt, water stain or identification painting.

Moreover, in the case of rollers without grooves on the side surface, if the RFID tags are installed directly on the side surface, when the rollers are ground, the RFID tags will be crashed and destroyed by the dowel disc. Therefore, the conventional technique for installing RFID rollers requires high cost for its installing and processing.

Therefore, it is necessary to provide an RFID tag holder to solve the above problems.

SUMMARY OF THE INVENTION

The present invention is directed to an RFID (Radio Frequency Identification) tag holder which is used to dispose an RFID tag in a disposing hole of a device, wherein the disposing hole is made of a magnetically attachable material. The RFID tag holder comprises: an RFID tag carrier, a metal substrate, a base and a holding unit. The RFID tag carrier is used to carry an RFID tag. The metal substrate has two through holes. The base has a circular surface and a holding portion, and at least one magnetic component is disposed therein. The shape of the circular surface matches the shape of the disposing hole, and the magnetic component is used to make the disposing hole magnetically attachable to combine the base with the disposing hole. The holding unit has two clip arms, and the clip arms grip the holding portion and hold the RFID tag carrier after passing through the through holes.

The RFID tag holder according to the present invention is suitable for installing RFID tag on any kind of apparatuses or devices, and has the following advantages:

1. Fast installation, low cost and reusability.
2. Suitable for disposing holes with any depth and size, thus improving the flexibility in application.
3. Disposing holes with different depth will not induce interference with the RFID tag, and the reading effect is improved.
4. The holder can be directly disposed in the disposing hole of a device (for example a roller), and extra processing cost for the device is not needed.
5. Dust-proof, water-proof and oil-resistant.
6. The number of the holding clips of the holding unit can be increased or reduced according to actual needs for better composability, extensibility and flexibility.

DETAILED DESCRIPTION OF THE INVENTION

Figure 1:
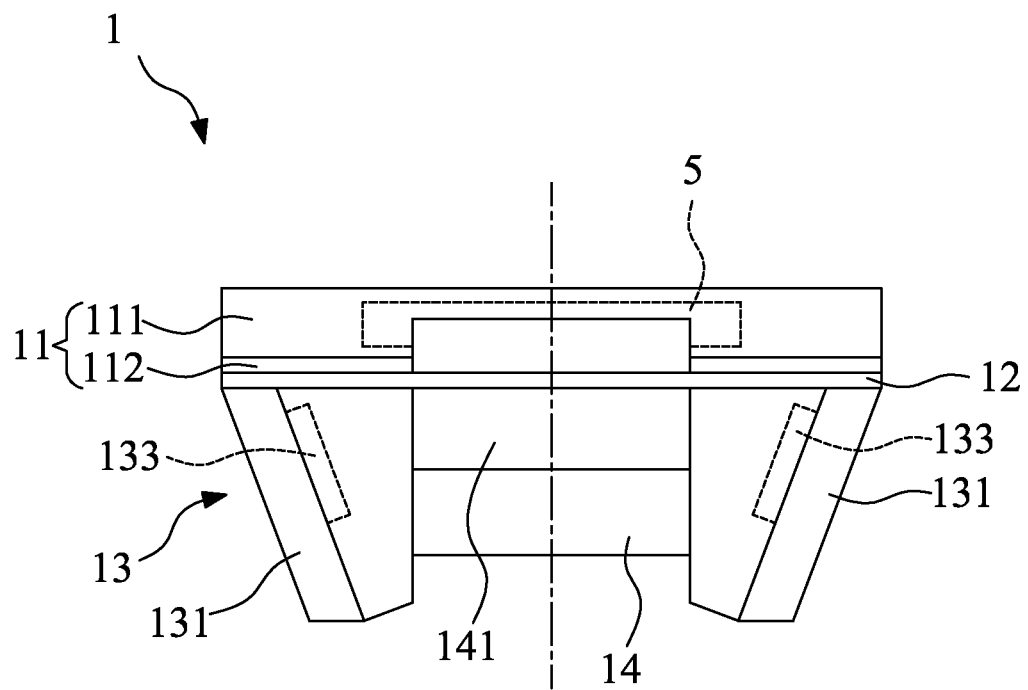
FIG. 1 is a schematic assembly view of an RFID (Radio Frequency Identification) tag holder according to a first embodiment of the present invention.
Figure 2:
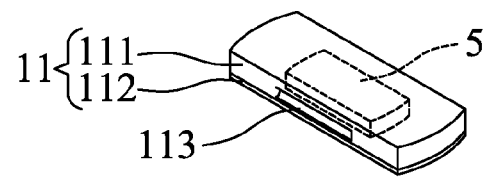
FIG. 2 is a schematic exploded view of the RFID tag holder according to the first embodiment of the present invention.
Figure 2:
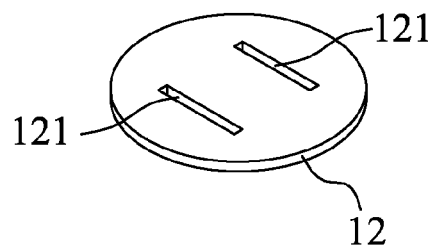
Figure 2:
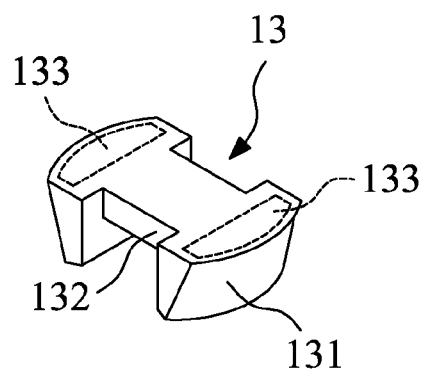
Figure 2:
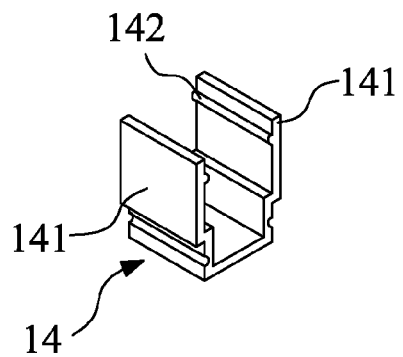
Figure 3:
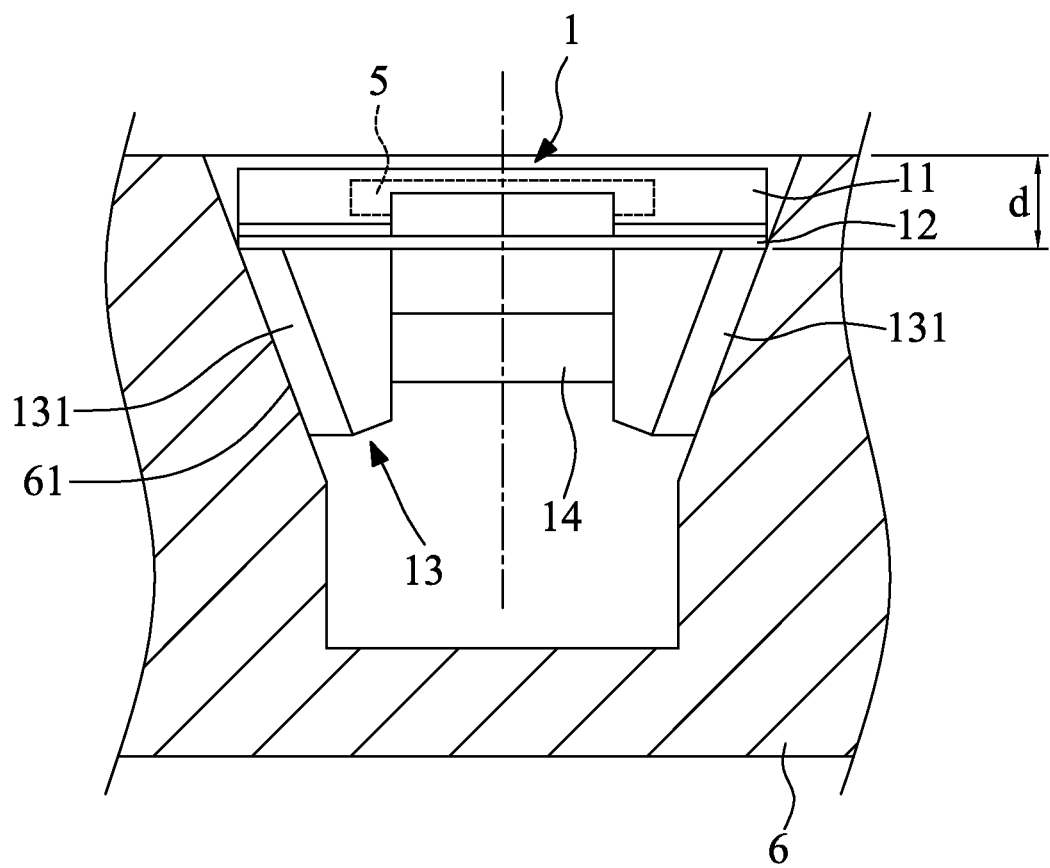
FIG. 3 is a schematic view of the RFID tag holder according to the first embodiment of the present invention disposed in a disposing hole.

FIG. 1 shows a schematic assembly view of an RFID (Radio Frequency Identification) tag holder according to a first embodiment of the present invention; FIG. 2 shows a schematic exploded view of the RFID tag holder according to the first embodiment of the present invention; and FIG. 3 shows a schematic view of the RFID tag holder according to the first embodiment of the present invention disposed in a disposing hole. As shown in FIGS. 1 to 3, the RFID tag holder 1 according to the first embodiment of the present invention is used to dispose an RFID tag 5 in a disposing hole 61 of a device 6 (for example a roller), wherein the disposing hole 61 is made of a magnetically attachable material.

The RFID tag holder 1 according to the present invention comprises an RFID tag carrier 11, a metal substrate 12, a base 13 and a holding unit 14. The RFID tag carrier 11 is used to carry the RFID tag 5. In the embodiment, the RFID tag carrier 11 is composed of an upper portion 111 and a bottom portion 112, so that the RFID tag 5 may be disposed between the upper portion 111 and the bottom portion 112. Preferably, the RFID tag carrier 11 may further comprise at least one information identifying tag or barcode (not shown). The periphery of the upper portion 111 and the bottom portion 112 may have a corresponding and matching structure with a recess and a convex, so that the upper portion 111 and the bottom portion 112 can be fastened to each other, which makes it simple to use.

In the embodiment, the metal substrate 12 has two through holes 121. The size of the metal substrate 12 is larger than that of the RFID tag 5. The metal substrate 12 is spaced apart from the RFID tag 5 by the bottom portion 112, and therefore there is a suitable and fixed distance between the metal substrate 12 and the RFID tag 5, so that the properties of the RFID tag 5 is more stable and controllable, and it can assure that the RFID tag 5 can be efficiently read. Besides, the size and shape of the metal substrate 12 may match those of a first depth d position of the disposing hole 61, thereby increasing the combination stability of the RFID tag holder 1 and the disposing hole 61.

The base 13 has a circular surface 131 and a holding portion 132, and at least one magnetic component 133 is disposed in the base 13. The shape of the circular surface 131 matches that of the disposing hole 61, and the magnetic component 133 is used to make the disposing hole 61 magnetically attachable to combine the base 13 with the disposing hole 61. In the embodiment, two magnetic components 133 are sealed in the base 13. The circular surface 131 is an inclined plane with cone shape, and the magnetic components 133 are disposed substantially parallel to the circular surface 131, so that the gap between the magnetic components 133 and the disposing hole 61 has better magnetically attaching strength.

The holding unit 14 has two clip arms 141, and the clip arms 141 grip the holding portion 132 and hold the RFID tag carrier 11 after passing through the through holes 121. Each clip arm 141 has a first holding structure 142, the RFID tag carrier 11 has two second holding structures 113, and the second holding structures 113 match the first holding structures 142. In the embodiment, each first holding structure 142 is a convex, and the corresponding second holding structure 113 is a recess, so that the clip arms 141 can grip the RFID tag carrier 11 more firmly.

It is understood that, after carrying the RFID tag 5, the RFID tag carrier 11 may be applied without the holding unit 14, so it can be individually used for detection, information reading and/or logistics management of any devices.

Figure 4:
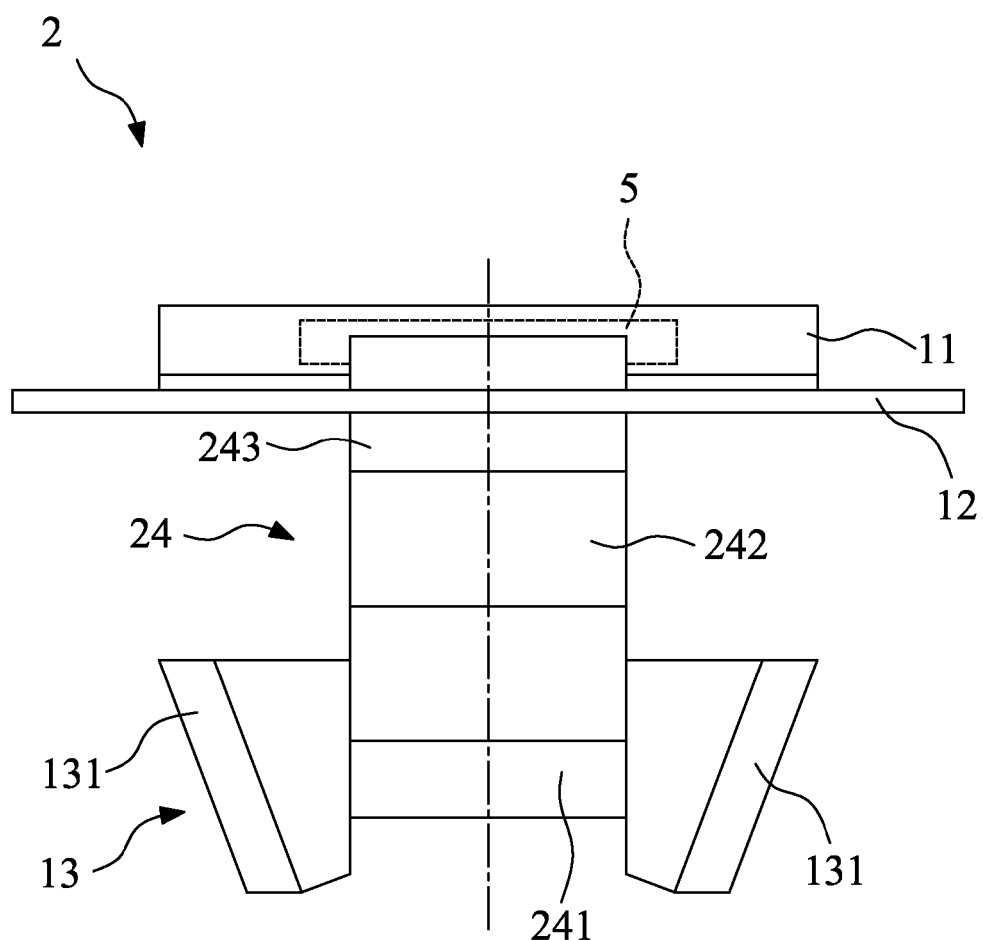
FIG. 4 is a schematic assembly view of an RFID tag holder according to a second embodiment of the present invention.
Figure 5:
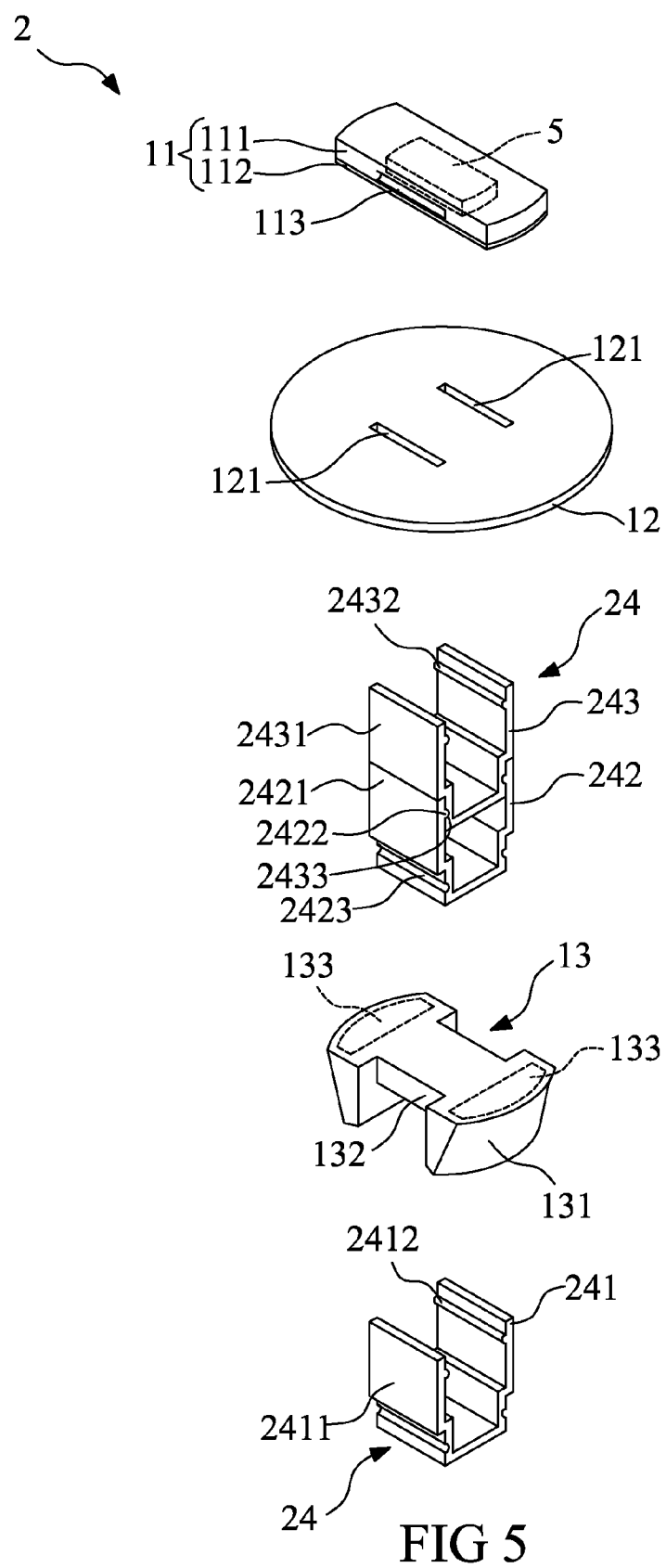
FIG. 5 is a schematic exploded view of the RFID tag holder according to the second embodiment of the present invention.

FIG. 4 shows a schematic assembly view of an RFID tag holder according to a second embodiment of the present invention; FIG. 5 shows a schematic exploded view of the RFID tag holder according to the second embodiment of the present invention. As shown in FIGS. 4 and 5, a holding unit 24 of the RFID tag holder 2 comprises a plurality of holding clips, each holding clip has two clip arms, and the holding clips are stacked and disposed by holding the adjacent holding clip with two clip arms. Each holding clip further comprises a third holding structure, and the first holding structure of each holding clip matches the third holding structure of the adjacent holding clip and the second holding structures of the RFID tag carrier.

In the embodiment, the difference between the three stacked holding clips 241, 242, 243 and the RFID tag holder 1 according to the first embodiment as shown above in FIGS. 1 and 2 is that, in the embodiment, two clip arms 2411 of a bottom holding clip 241 grip the holding portion 132 after stacking, the first holding structures 2412 of the clip arms 2411 hold the third holding structures 2423 disposed at the bottom of the adjacent middle holding clip 242, the first holding structures 2422 of the clip arms 2421 of the middle holding clip 242 hold the third holding structures 2433 disposed at the bottom of a top holding clip 243 after stacking, and the first holding structures 2432 thereof hold the second holding structures 113 of the RFID tag carrier 11 after two clip arms 2431 of the top holding clip 243 passing through the through holes 121 of the metal substrate 12.

Preferably, the size and shape of the metal substrate 12 match those of a second depth position (disposed close to the opening of the disposing hole) of the disposing hole, and the size and shape of the base 13 match those of a third depth position (disposed far away from the opening of the disposing hole) of the disposing hole, thereby increasing the combination stability of the RFID tag holder 2 and the disposing hole. The other elements which are the same as the RFID tag holder 1 according to the first embodiment as shown above in FIGS. 1 and 2 are designated by the same reference numbers, and therefore the description is skipped.

Figure 6:
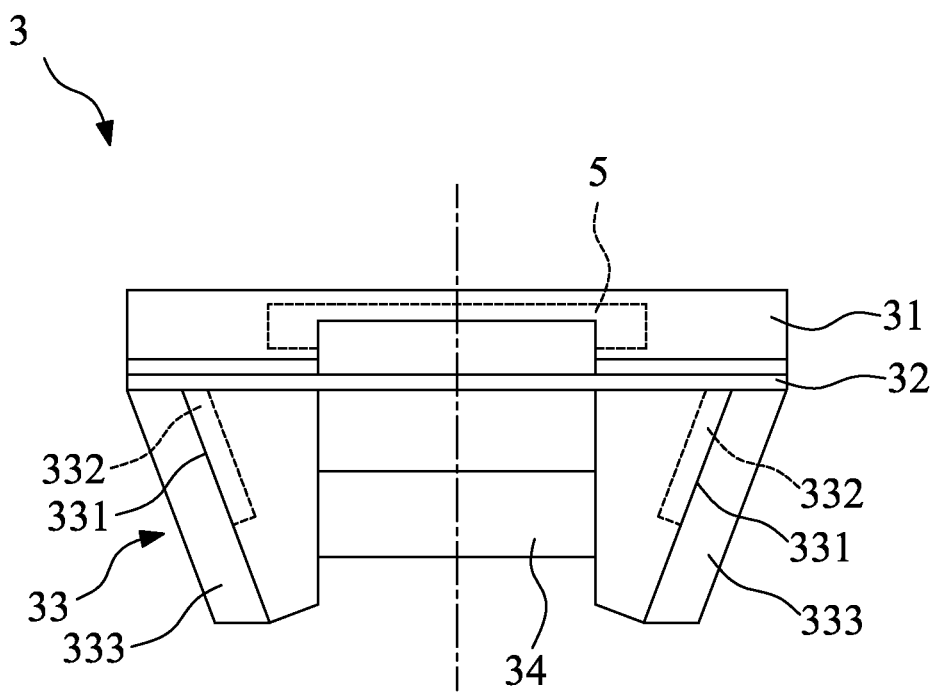
FIG. 6 is a schematic view of an RFID tag holder according to a third embodiment of the present invention.

FIG. 6 shows a schematic view of an RFID tag holder according to a third embodiment of the present invention. The difference between the RFID tag holder 3 according to the third embodiment and the RFID tag holder 1 according to the first embodiment as shown above in FIGS. 1 and 2 is that, in the embodiment, a base 33 of the RFID tag holder 3 comprises two grooves 331 and two magnetic components 332, the grooves 331 are formed near a circular surface 333 of the base 33, the magnetic components 332 are disposed in the grooves 331, and the metal substrate 12 covers the grooves 331, so that the magnetic components 332 are covered in the grooves 331. The other elements which are the same as the RFID tag holder 1 according to the first embodiment as shown above in FIGS. 1 and 2 are designated by the same reference numbers, and therefore the description is skipped.

Figure 7:
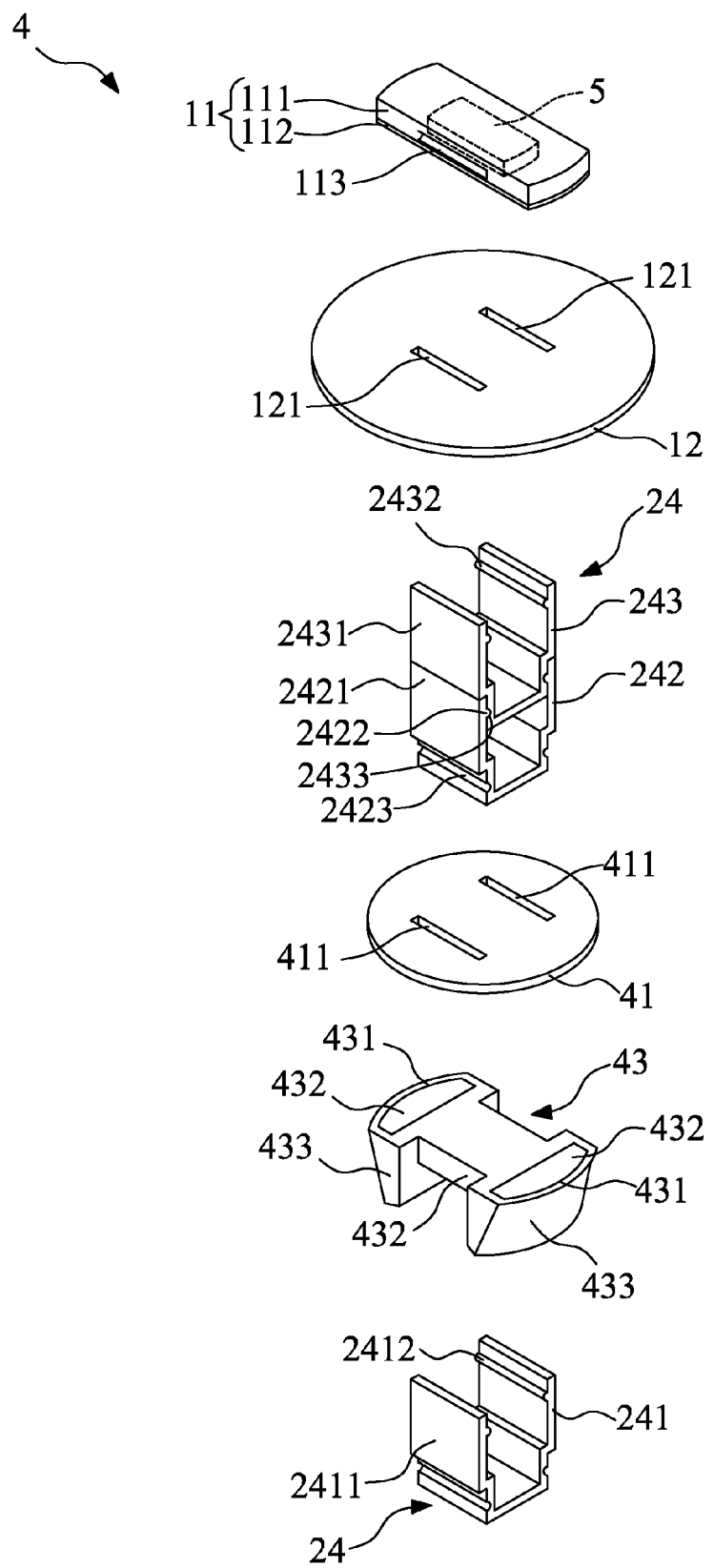
FIG. 7 is a schematic view of an RFID tag holder according to a fourth embodiment of the present invention.

FIG. 7 shows a schematic view of an RFID tag holder according to a fourth embodiment of the present invention. The difference between the RFID tag holder 4 according to the fourth embodiment and the RFID tag holder 2 according to the second embodiment as shown above in FIGS. 4 and 5 is that, in the embodiment, the RFID tag holder 4 further comprises a bottom plate 41. The bottom plate 41 is preferably a metal plate, the bottom plate 41 has two penetrating holes 411, and two clip arms 2411 of the bottom holding clip 241 hold the adjacent holding clip 242 after passing through the penetrating holes 411. A base 43 of the RFID tag holder 4 comprises two grooves 431 and two magnetic components 432, the grooves 431 are formed near a circular surface 433 of the base 43, the magnetic components 432 are disposed in the grooves 431, and the bottom plate 41 covers the grooves 431, so that the magnetic components 432 are covered in the grooves 431. It is understood that the base 43 may have no grooves 431, and that the magnetic components 432 may be sealed in the base 43 (see FIGS. 1 and 2).

Preferably, the size and shape of the metal substrate 12 match those of a fourth depth position (disposed close to the opening of the disposing hole) of the disposing hole, and the size and shape of the bottom plate 41 and the base 43 are match those of a fifth depth position (disposed far away from the opening of the disposing hole) of the disposing hole, thereby increasing the combination stability of the RFID tag holder 4 and the disposing hole. The other elements which are the same as the RFID tag holder 2 according to the second embodiment as shown above in FIGS. 4 and 5 are designated by the same reference numbers, and therefore the description is skipped.

The RFID tag holder according to the present invention is suitable for installing RFID tag on any kind of apparatuses or devices, and has the following advantages:

1. Fast installation, low cost and reusability.
2. Suitable for disposing holes with any depth and size, and the flexibility is improved.
3. Disposing holes with different depth will not induce interference with the RFID tag, and the reading effect is improved.
4. The holder may be directly disposed in the disposing hole of a device (for example a roller), and extra processing cost for the device is not needed.
5. Dust-proof, water-proof and oil-resistant.
6. The number of the holding clips of the holding unit may be increased or reduced according to actual needs for better composability, extensibility and flexibility.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. An RFID (Radio Frequency Identification) tag holder used to dispose an RFID tag in a disposing hole of a device, wherein the disposing hole is made of a magnetically attachable material, the RFID tag holder comprising:
    an RFID tag carrier used to carry an RFID tag;
    a metal substrate having two through holes;
    a base having a circular surface, a holding portion, and at least one magnetic component disposed therein, wherein the shape of the circular surface matches the shape of the disposing hole, and the magnetic component is used to make the disposing hole magnetically attachable to combine the base with the disposing hole; and
    a holding unit having two clip arms, wherein the clip arms grip the holding portion and hold the RFID tag carrier after passing through the through holes.

2. The RFID tag holder as claimed in claim 1, wherein the circular surface is an inclined plane with cone shape.

3. The RFID tag holder as claimed in claim 1, wherein the magnetic component is disposed substantially parallel to the circular surface.

4. The RFID tag holder as claimed in claim 1, wherein the base further comprises two grooves, the at least one magnetic component comprises two magnetic components, the grooves are formed near the circular surface, the magnetic components are disposed in the grooves, and the metal substrate covers the grooves.

5. The RFID tag holder as claimed in claim 1, wherein each clip arm has a first holding structure, the RFID tag carrier has two second holding structures, and the second holding structures match the first holding structures.

6. The RFID tag holder as claimed in claim 1, wherein the holding unit comprises a plurality of holding clips, each holding clip has two clip arms, the holding clips are stacked and disposed by holding the adjacent holding clip with two clip arms, two clip arms of a bottom holding clip of the stacked holding clips grip the holding portion and hold the adjacent holding clip, and two clip arms of a top holding clip of the stacked holding clips hold the RFID tag carrier after passing through the through holes.

7. The RFID tag holder as claimed in claim 6, wherein each clip arm has a first holding structure and a third holding structure, the RFID tag carrier has two second holding structures, the first holding structures match the second holding structures and the third holding structures, two clip arms of the bottom holding clip hold the third holding structures of the adjacent holding clip by the first holding structures after passing through the penetrating holes, and two clip arms of the top holding clip hold the second holding structures of the RFID tag carrier by the first holding structures after passing through the through holes.

8. The RFID tag holder as claimed in claim 6, further comprising a bottom plate, wherein the bottom plate has two penetrating holes, the base further comprises two grooves, the at least one magnetic component comprises two magnetic components, the grooves are formed near the circular surface, the magnetic components are disposed in the grooves, two clip arms of the bottom holding clip hold the adjacent holding clip after passing through the penetrating holes, and the bottom plate covers the grooves.

9. The RFID tag holder as claimed in claim 1, wherein the RFID tag carrier comprises an upper portion and a bottom portion, so that the RFID tag is disposed between the upper portion and the bottom portion.

10. The RFID tag holder as claimed in claim 1, wherein the RFID tag carrier further comprises at least one information identifying tag or barcode.

* * * * *